Figure 1:
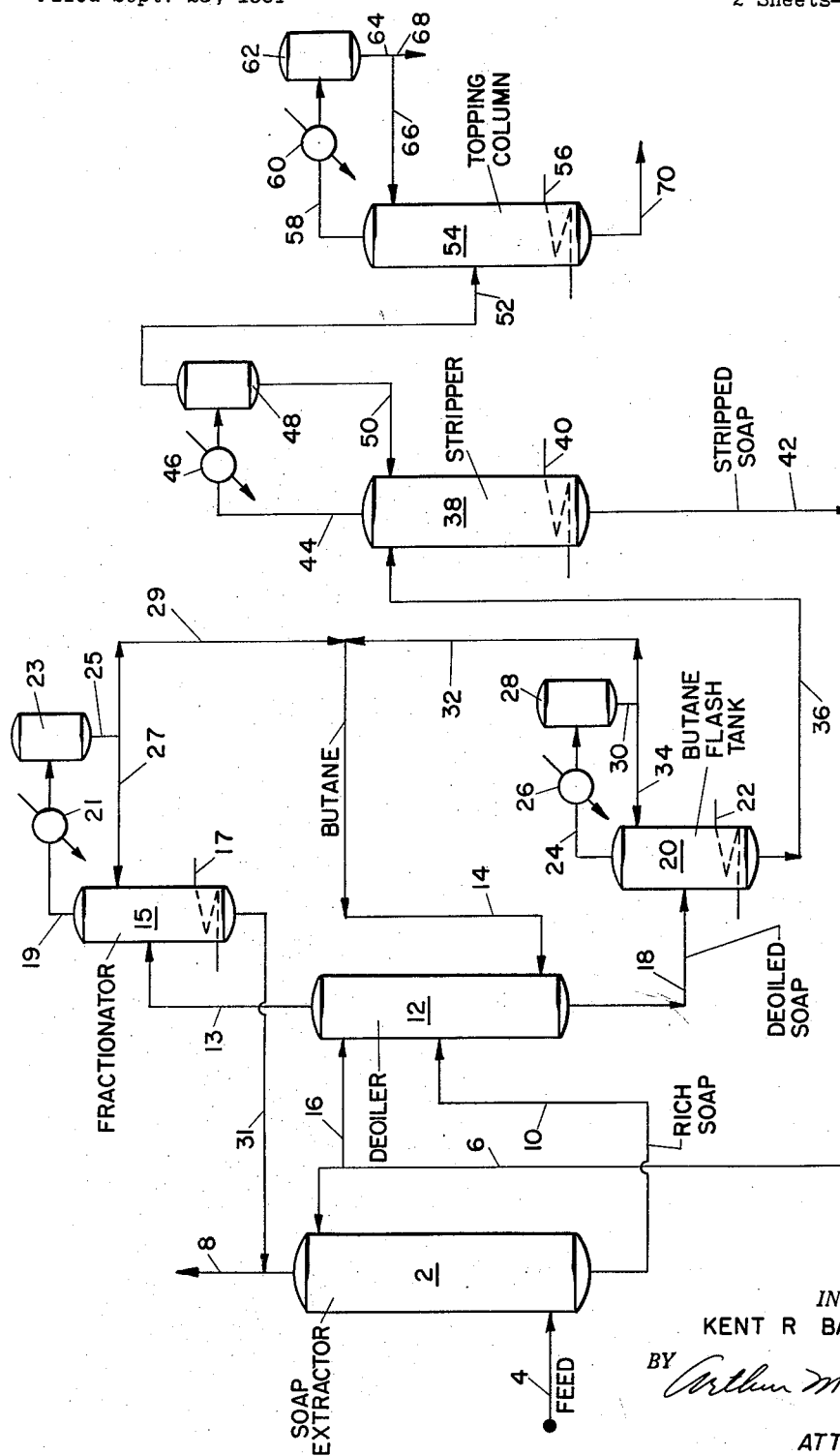

Sept. 11, 1956　　　K. R. BARNARD　　　2,762,830
RECOVERY OF OIL SOLUBLE ALCOHOLS FROM HYDROCARBON SOLUTIONS
Filed Sept. 28, 1951　　　　　　　　　　　　2 Sheets-Sheet 1

INVENTOR.
KENT R BARNARD
BY
ATTORNEY

United States Patent Office 2,762,830
Patented Sept. 11, 1956

2,762,830

RECOVERY OF OIL SOLUBLE ALCOHOLS FROM HYDROCARBON SOLUTIONS

Kent R. Barnard, Tulsa, Okla., assignor to Stanolind Oil and Gas Company, Tulsa, Okla., a corporation of Delaware Application September 28, 1951, Serial No. 248,677

5 Claims. (Cl. 260—450)

The present invention relates to a method for the recovery of various oxygenated organic chemicals from hydrocarbon solutions thereof. More particularly, it pertains to a process for recovering in substantially pure form a relatively high percentage of oil soluble alcohols from crude hydrocarbon mixtures containing carbonyl compounds.

While the principles taught herein find application in the recovery of chemicals from numerous kinds of crude hydrocarbon mixtures, the present description deals particularly with the problems encountered in recovering valuable chemicals from the oil stream produced by the hydrogenation of carbon monoxide in the presence of a fluidized alkali-promoted iron catalyst under known synthesis conditions. This oil fraction obtained in the hydrocarbon synthesis process, contains a rather wide variety of acids, carbonyl compounds (ketones and aldehydes), and alcohols toegther with a small proportion of esters. For example, in hydrocarbon synthesis plants designed to produce approximately 650,000 lbs. per day of liquid hydrocarbons, there are simultaneously produced along with this oil fraction 76,000 lbs. of oil soluble carbonyl compounds, 61,700 lbs. of oil soluble alcohols, 21,000 lbs. of esters, and 69,300 lbs. of oil soluble acids. Owing to their value as chemicals, it is desirable to separate these compounds from the oil stream as completely as possible. Also in the subsequent conversion of the aforesaid oil fraction into gasoline, it is imperative that such compounds either be removed from the oil or converted into substances such as, for example, unsaturated hydrocarbons, which can then be utilized in conjunction with the hydrocarbons originally synthesized to make high quality motor fuels.

Because of the close proximity in boiling points of these various oil soluble chemicals to the hydrocarbons constituting the oil fraction, separation of chemicals from hydrocarbons by normal fractional distillation methods is a practical impossibility. Normally, in the recovery of chemicals from the oil stream, the raw primary synthesis oil, as it comes from the separating unit, is treated with sufficient caustic to neutralize the acids present. There result two layers, a neutral oil layer containing the bulk of the non-acid oil soluble chemicals and a lower aqueous layer containing the acids in the form of their corresponding salts together with an appreciable percentage, i. e., approximately from 15 to 25 weight per cent of non-acid chemicals which have been solubilized thereby and from about 10 to 30 weight per cent of hydrocarbons, depending, of course, on the strength of the caustic initially added. While recovery of the acids from the aforesaid aqueous layer can be accomplished without substantial difficulty, recovery of the solubilized chemicals and hydrocarbons presents a rather formidable problem especially where it is desired to effect a substantially complete separation of chemicals from hydrocarbons.

To date, the most effective way found for recovering oil soluble chemicals from substantially acid-free hydrocarbon mixtures of the type contemplated herein, has been to subject such mixtures to extraction with various types of carboxylic acid salt solutions. Such treatment of the chemical-containing hydrocarbon mixtures results in removing therefrom a large percentage of all the chemicals present; however, in accomplishing this object, it is found that the resulting extract product contains from about 10 to 35 weight per cent of hydrocarbons, the concentration thereof varying directly with the strength and type of salt solutions employed. Also, with the concentrations of salt solutions utilized and with the volume ratios of oil to salt solutions employed, it was found that while substantially hydrocarbon-free fraction of chemicals could be obtained by employing certain of the procedures previously available, the distribution of carbonyl compounds and alcohols present in the resulting product was such that separation of major amounts of these two classes of compounds from one another, was practically impossible. Hydrogenation of these mixtures to convert the carbonyls into their corresponding alcohols did not solve the problem because the secondary alcohols derived from the ketones present have limited commercial utility and moreover they are even more difficult to separate from the desired primary alcohols by distillation. Prior workers attempting to solve this problem did not recognize or appreciate the importance of salt solution concentrations and the importance of the volume ratio of oil to salt solution for a given strength of salt solution employed and the influence that such phenomena have on the concentration and the nature of the products extracted from such hydrocarbon mixtures.

Accordingly, it is an object of my invention to provide a method by which high percentages of oil soluble alcohols can be recovered effectively from the aforesaid hydrocarbon mixtures. It is a further object of my invention to recover oil soluble alcohols from hydrocarbon mixtures substantially free from both hydrocarbons and from carbonyl and ester compounds. It is a still further object of my invention to recover oil soluble alcohols in purified form from hydrocarbon solutions thereof by extracting the latter with a suitable carboxylic acid salt solution, the volume ratio of the oil to salt solution employed in the extraction step varying directly with the concentration of said salt solution.

Figure 2:
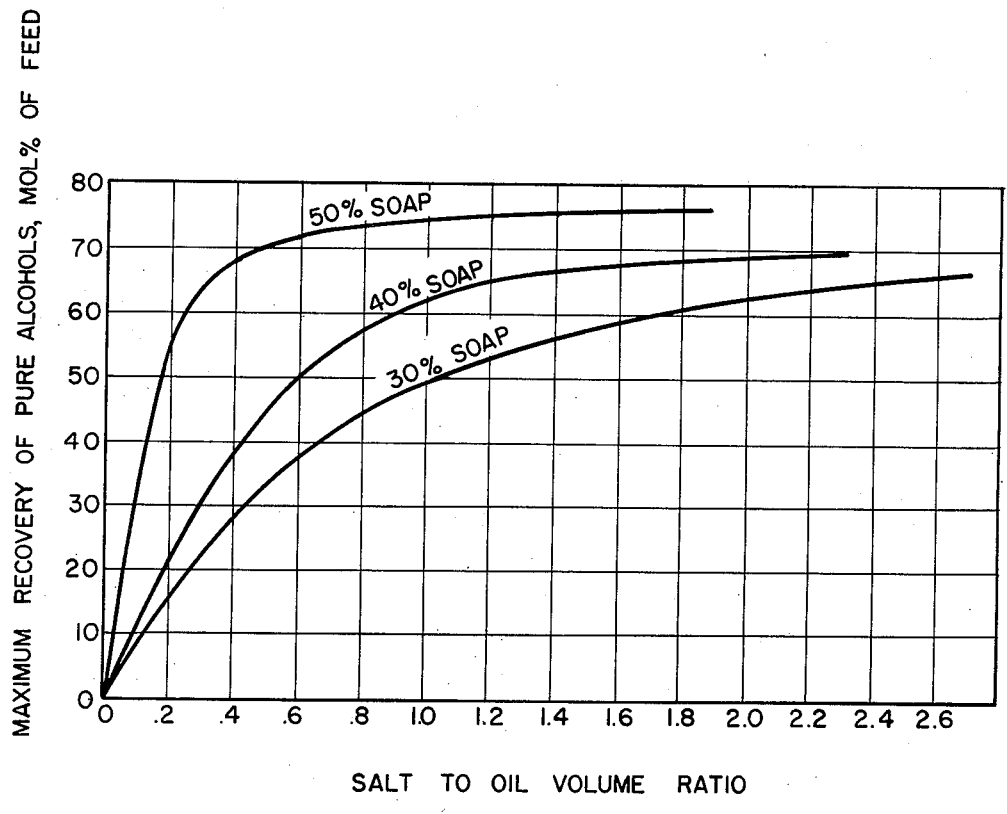

Figure 1 is a flow diagram of an embodiment of the process of my invention while Figure 2 is a plot showing the salt to oil volume ratio required for a salt or soap solution of a given strength to recover a given quantity (mol per cent) of pure alcohol from the crude or neutral HCS oil.

Briefly, the process of my invention comprises recovering oil soluble alcohols from a variety of hydrocarbon mixtures containing various non-acid chemicals such as alcohols, esters and carbonyl compounds by first subjecting such mixtures to extraction with a given strength of an aqueous solution of carboxylic acid salts at a given oil to salt volume ratio. Permissible ranges of salt solution concentrations and of oil to soap ratios for securing optimum results, will be more specifically defined below. The combination of salt solution concentration and oil to salt ratio selected, however, is chosen for the purpose of recovering the majority of the alcohols present, while at the same time holding the quantity of carbonyl compounds extracted to a minimum. The resulting extract which contains the bulk of the oil soluble alcohols, together with minor amounts of carbonyl and ester compounds and hydrocarbons is next subjected to a countercurrent extraction operation with a lean aqueous solution of carboxylic acid salts and a relatively low boiling hydrocarbon, such as, for example, propane or butane. The chemical rich extract is introduced at an intermediate point of an extraction zone with the lean salt solution and light hydrocarbon being introduced at the top and bottom of the extraction zone, respectively. This dual extraction step serves to separate essentially all the hydrocarbons present, as well as the higher molecular weight carbonyl and ester compounds from the aqueous salt solution extract of alcohols. The presence of a lean salt solution in the extraction zone enhances this separation. The percentage of carbonyls removed by the aforesaid hydrocarbon extraction step should generally be limited to those boiling above about 110° C. with the lower boiling carbonyl components being separated by means of the distillation operation referred to in detail below. Complete removal of the carbonyl fraction is not economically accomplished by the light hydrocarbon extraction step alone, since excessively high salt and light hydrocarbon circulation rates are required to prevent appreciable removal of the higher alcohols at the same time.

The alcohol-rich salt extract is withdrawn from a lower section of the extraction zone, substantially free from hydrocarbons and high boiling (110° C.) carbonyl compounds, and introduced into a stripping column where a concentrated salt solution is removed as bottoms and an overhead recovered containing all of the alcohols present in the original extract together with low boiling carbonyl and ester compounds. This overhead, which contains about 5 per cent water, is next fractionally distilled up to a temperature of about 110° C. to remove the remaining carbonyl and ester compounds together with some of the light alcohols, leaving a bottoms of pure oil soluble alcohols which constitute the majority of such alcohols originally present in the oil.

The temperatures at which the salt extraction step is carried out may vary widely; however, in general, this operation is effected at temperatures ranging from about 15° to about 60° C. or higher, but preferably from about 20° to about 30° C. Washing of the salt extract with light hydrocarbon should be carried out under conditions of temperature and pressure so that the hydrocarbon is maintained in liquid phase. For example, when employing butane for this purpose at temperatures of 25° to 30° C., the pressure in the extraction tower should be at least 30 to 35 p. s. i. g.

The salt solutions used in the process of my invention may likewise vary. Thus, for example, I have found that salt solutions prepared from the entire acid fraction present in hydrocarbon synthesis oil are satisfactory for my purpose. These salts, hereinafter referred to generally as "total soaps," are obtained by neutralizing the fatty acids present in the raw primary hydrocarbon synthesis oil with a suitable base. The acids present in such oil ordinarily have an average molecular weight of from about 125 to about 135 with approximately 17.5% consisting of $C_4$ and lighter acids, 23.5% consisting of $C_5$ acids, 19.0% consisting of $C_6$ acids, 12.5% consisting of $C_7$ acids, 8.0% consisting of $C_8$ acids, 5.3% consisting of $C_9$ acids, 3.4% consisting of $C_{10}$ acids, 2.3% consisting of $C_{11}$ acids, and 8.5% consisting of $C_{12}$ and heavier acids. The resulting total soap prepared as described above contains dissolved chemicals and hydrocarbons that may be stripped off leaving a concentrate of total soaps which is then diluted to the desired strength.

Also various cuts or fractions of the total acids present in the hydrocarbon synthesis oil may be employed in preparing suitable salt extractant solutions. Thus, for example, a fraction of $C_2$ to $C_6$ carboxylic acid salts, hereinafter referred to as selected salts, may be utilized for this purpose. This particular range of salts is obtained by first acidifying a salt solution formed by completely neutralizing raw primary synthesis oil to liberate the fatty acids, washing therefrom free mineral acid and inorganic salt formed during the acidification step, and thereafter distilling the resulting mixture of washed acids up to a temperature of about 210° C. The distillate thus obtained may then be neutralized by addition of a substantially stoichiometric quantity of a suitable base to yield the desired $C_2$ to $C_6$ salt fraction which may then be diluted with water to the required concentration. As examples of suitable bases for use in the formation of these salts, there may be mentioned ammonium hydroxide, ammonium carbonate, and the various hydroxides and carbonates of the alkali metals.

In carrying out the process of my invention, the concentrations of salt solutions employed depend upon a number of factors; however, in general concentrations ranging from about 25 to about 55 weight per cent are satisfactory, especially concentrations of from about 40 to 50 weight per cent. When employing selected salt solutions in the range of from 25 to 55 weight per cent, the volume ratio of oil to salt solution should fall within a range of from about 0.4:1 to about 0.9:1 for 25 weight per cent salt solutions, and from about 1.5:1 to about 7.0:1 for 55 weight per cent salt solutions. Volume ratios of oil to total soap and concentrations of total soap solutions follow the same general pattern indicated for selected salt solutions; however, for a given concentration the preferred volume ratio of oil to soap for total soap solutions is slightly higher than that employed for selected salt solutions.

The quantity of chemicals extracted from the oil by a given aqueous salt solution depends upon the concentration thereof. Total soap solutions, however, are capable of extracting more chemicals from hydrocarbon solutions than selected salt solutions of equal strength. Thus, for example, a 30 weight per cent total soap solution extracts as many chemicals from hydrocarbon mixtures of the aforesaid type as a 50 weight per cent selected salt solution derived from $C_2$ to $C_6$ carboxylic acids having an average molecular weight of from 95 to about 105; however, the latter salt solution extracts less hydrocarbons along with the chemicals than are found to be present in the 30 weight per cent total soap extracts.

*Example*

The process of my invention is further illustrated by the following specific example in which reference is made to Fig. 1 wherein a hydrocarbon synthesis oil from which the acids have been removed is fed to the bottom of extraction column 2 through line 4. The total volume of oil fed amounts to 10,000 lbs. and is composed of 850 lbs. of oil soluble alcohols (7.41 lb. mols), 690 lbs. of carbonyl compounds (6.09 lb. mols), 210 lbs of esters (1.65 lb. mols) and 8250 lbs. of hydrocarbons. At a point near the top of extraction tower 2, is introduced through line 6 a total of 6,000 lbs. of a $C_2$ to $C_6$ selected salt solution prepared as previously described and having a concentration of 50 weight per cent. Make-up soap solution is added to the system, as needed, through line 7. The extraction step is carried out at a temperature of about 30° C. The salt solution is added at a rate sufficient to give an oil to salt volume ratio in tower 2 of 2.5:1. From the top of extraction tower 2, a raffinate is withdrawn through line 8 totaling 9,157 lbs. and consisting of 275 lbs. of alcohols (1.63 lb. mols), 552 lbs. of carbonyls (4.57 lb. mols), 180 lbs. of esters (1.35 lb. mols, and 8,150 lbs. of hydrocarbons.

The raffinate fraction withdrawn through line 8 may be further refined by using it as a feed stream in a system substantially identical with the one described herein so that the chemicals remaining in said feed may be recovered. The rich salt extract in the bottom of tower 2 is withdrawn therefrom through line 10 and sent to de-oiling column 12 where it is introduced at an intermediate point thereof. Tower 12 is operated under a pressure of about 50 p. s. i. g. and is maintained at a temperature of about 30° C. The rich salt solution fed to the de-oiling tower contains 575 lbs. of alcohols (5.78 lb. mols), 138 lbs. of carbonyls (1.52 lb. mols), 30 lbs. of esters (0.30 lb. mol), and 100 lbs. of hydrocarbons, amounting to 843 lbs. of chemicals and hydrocarbons extracted from the original feed.

A total of 830 lbs. of butane is added at the bottom of deoiling tower 12 through line 14 where it meets a descending stream of rich salt solution. Extraction of the latter in this manner serves to remove heavy hydrocarbons as well as the large majority of the esters and carbonyl compounds having 6 or more carbon atoms from the salt extract. Some alcohols are also removed; however, the majority of these are recovered by introducing at a point near the top of tower 12, 1,500 lbs. of lean aqueous 50 weight per cent $C_2$ to $C_6$ salt solution through line 16. Under the conditions thus established in tower 12, a maximum quantity of the alcohols present in the rich salt solution fed through line 10 is removed from the bottom of the tower through line 18 with a minimum of carbonyls, esters and contaminated hydrocarbons. A butane-rich stream containing heavy hydrocarbons, esters, carbonyls having approximately 6 or more carbon atoms, and some alcohols is taken off from tower 12 through line 13 and sent to fractionating tower 15, equipped with reboiler 17. This tower is operated at about 50 p. s. i. pressure and the overhead, which consists essentially of butane, is taken off through line 19, condenser 21 and collected in tank 23 where a portion is returned through lines 25 and 27 as reflux to the column. The balance of the condensate is returned to column 12 via lines 29 and 14. The bottoms from tower 15 passes through line 31 and is combined with the raffinate oil stream in line 8.

The stream passing through line 18 consists of 533 lbs of alcohols (5.55 lb. mols), 66 lbs. of carbonyls (0.91 lb. mol), 11 lbs. of esters (0.12 lb. mol) and substantially no hydrocarbons heavier than butane. This stream contains a total of 610 lbs. of chemicals and is sent to butane recovery column 20, equipped with reboiler 22, which is preferably operated under the same pressure as that employed in tower 12. Butane is distilled off through line 24, condenser 26, the resulting condensate recovered in tank 28, and 150 lbs. of this fraction withdrawn through line 30 and recycled to line 14 via line 32. The balance of the condensate in tank 28 is returned as reflux to column 20 through line 34. The residue in column 20, which consists essentially of chemicals and salt solution free from hydrocarbons, is withdrawn and sent through line 36 to the upper portion of stripping column 38, equipped with reboiler 40. Within this column separation of the aqueous and oil phases is effected with the concentrated aqueous salt phase being withdrawn as bottoms through line 42 and returned to column 2 via line 6. The overhead from column 38 is withdrawn through line 44 and condenser 46 and allowed to stratify in separator 48. The water layer is returned to the stripping column as reflux through line 50, while the oil layer is taken off through line 52 and introduced through topping column 54, equipped with reboiler 56, where light chemicals are stripped off overhead through line 58 and condenser 60 and collected in decanter 62. A portion of the resulting water-layer and oil-layer condensate is withdrawn from tank 62 through line 64 and returned as reflux through line 66. The remainder of the condensate is withdrawn through line 68. The chemicals in the combined water-layer and oil-layer distillate product streams are water soluble and consist of 36 lbs. of alcohols (0.55 lb. mol), 66 lbs. of carbonyls (0.91 lb. mol), 11 lbs. of esters (0.12 lb. mol), 47 lbs. of water and no hydrocarbons. This stream can be subjected to a water washing step to recover the water soluble alcohols and ketones after which the resulting washings can be sent to a suitable fractionating column where carbonyls are separated from alcohols by means of extractive distillation with water or by other known methods. The bottoms stream produced in column 54 as a result of the topping operation is withdrawn through line 70 to obtain 498 lbs. of pure oil soluble alcohols corresponding to a recovery of 67% mol based on the quantity of alcohols present in the feed to column 2.

I have further observed with salt solutions of the above mentioned types, that as the concentration of the extractant solution increases the permissible volume ratio of oil to salt solution for securing the maximum practical recovery of pure oil soluble alcohols increases. For a given concentration of salt solution, decreasing percentages of pure alcohols are obtained with increasing volume ratios of oil to salt solution. These phenomena are further illustrated in the table appearing below in which a $C_2$ to $C_6$ salt solution, prepared from carboxylic acids having an average molecular weight of from about 85 to 115, was employed. The column at the extreme right represents the quantity of pure alcohols recovered from a typical hydrocarbon synthesis oil in accordance with the procedure given above in the description of the aforesaid accompanying flow diagram.

| Salt Conc. Weight | Oil/Salt Volume Ratio | Mol Percent Recovery in Extractor | | | Mol Percent Recovery of Pure Alcohols |
|---|---|---|---|---|---|
| | | Alcohols | Carbonyls | Esters | |
| 50 | 1.3:1 | 86 | 38 | 30 | 74 |
| | 6:1 | 57 | 14 | | 50 |
| | 0.5:1 | 93 | 63 | 53 | |
| 40 | 0.7:1 | 77 | 37 | 29 | 67 |
| | 1.7:1 | 58 | 22 | | 50 |
| | 0.5:1 | 70 | 36 | | 62 |
| 30 | 1:1 | 59 | 28 | 28 | 50 |
| | 0.3:1 | 77 | 51 | | |

From the foregoing table it may be seen that for the same quantity of pure oil soluble alcohols recovered, the oil to salt solution ratio permissible to achieve this result increases with increasing concentration of the salt solution utilized. It should likewise be noted that with salt solutions of 30 and 50 weight per cent, when using an oil to salt volume ratio of 0.3:1 and 0.5:1, respectively, the results obtainable by operating within the ranges claimed herein are not secured. Thus, the data in the above table indicate that with a 50 weight per cent salt solution and using an oil-salt volume ratio of 0.5:1, relatively high percentages of carbonyls and esters were extracted along with the alcohols. The same holds true in the case of 30 weight per cent salt solutions when employing an oil-salt volume ratio of 0.3:1. It may be seen that while 93 mol per cent of alcohols were extracted in the case where a 50 weight per cent salt solution was employed in an oil-salt volume ratio of 0.5:1, it was necessary to use roughly three times as much salt solution to obtain this result as was used to recover 86 mol per cent of the alcohols using a salt solution of the same concentration which was employed in an oil-salt volume ratio coming within the range taught by the process of my invention. Moreover, it is to be pointed out that although 93 mol per cent of the alcohols were recovered, they were contaminated with 63 mol per cent of carbonyls and 58 mol per cent of esters; whereas, by operating with the oil-salt volume ratios taught herein, and using a 50 weight per cent salt solution, 86 mol per cent of alcohols were recovered containing as contaminants only 38 mol per cent of carbonyls and 30 mol per cent of esters. The trends set out in the above table for selected salt solutions also hold true for total soap solutions.

The curves in the graph of Figure 2 further illustrate the importance of concentration and the volume ratio of oil to salt solution in recovering the maximum quantity of pure oil-soluble alcohols from hydrocarbon mixtures thereof. From the graph it is clearly apparent that with more concentrated salt solutions, higher oil to salt ratios can be tolerated in recovering the same quantity of pure alcohols. Stated otherwise, for a given recovery of alcohols, a lower volume of the more concentrated salt solution may be employed than is found necessary to recover the same amount of alcohols with a less concentrated salt solution.

It will be obvious to those skilled in the art to which the present invention relates that numerous modifications in manipulative steps may be made without departing from the scope thereof. In general, it may be said that my invention contemplates the recovery of oil soluble alcohols from hydrocarbon solutions thereof containing carbonyl compounds wherein maximum recovery of oil soluble alcohols is secured, together with a minimum of carbonyls, by employing aqueous solutions of the salts of carboxylic acids under conditions such that the volume ratio of oil to salt solution employed varies directly with the concentration of the salt solution employed.

I claim:

1. In a process for recovering oil soluble alcohols from hydrocarbon solutions thereof containing carbonyl compounds, at least some of which have a boiling range close to or coinciding with said alcohols and wherein said solution is subjected to extraction in an extraction zone with a 25 to 55 weight per cent of an aqueous $C_2$ to $C_6$ carboxylic acid salt solution, the steps which comprise introducing into said zone said hydrocarbon solution, introducing at a point above the introduction of said hydrocarbon solution an aqueous $C_2$ to $C_6$ carboxylic acid salt solution in an amount sufficient to produce in said extraction zone volume ratios of oil to salt solution ranging from about 0.4:1 to about 0.9:1 for 25 weight per cent salt solutions to from about 1.5:1 to about 7.0:1 for 55 weight per cent salt solutions, withdrawing an aqueous salt solution (1) containing oil soluble alcohols in a higher ratio to carbonyl compounds than that originally present in said hydrocarbon solution, introducing salt solution (1) into a second extraction zone, introducing lean aqueous $C_2$ to $C_6$ salt solution (2) into said second extraction zone at a point above the introduction of said salt solution (1), introducing a relatively low boiling hydrocarbon into said second extraction zone at a point below the introduction of said salt solution (1) to form a low boiling hydrocarbon rich layer and an aqueous salt solution (3) containing oil soluble alcohols in a higher ratio to carbonyls than that present in salt solution (1).

2. The process of claim 1 in which butane is the relatively low boiling hydrocarbon employed.

3. In a process for recovering oil soluble alcohols from hydrocarbon solutions thereof containing carbonyl compounds, at least some of which have a boiling range close to or coinciding with said alcohols and wherein said solution is subjected to extraction in an extraction zone with a 25 to 55 weight per cent of an aqueous $C_2$ to $C_6$ carboxylic acid salt solution, the steps which comprise introducing said hydrocarbon solution into said zone, introducing at a point above the introduction of said hydrocarbon solution an aqueous $C_2$ to $C_6$ carboxylic acid salt solution in an amount sufficient to produce in said extraction zone volume ratios of oil to salt solution ranging from about 0.4:1 to about 0.9:1 for 25 weight per cent salt solutions to from about 1.5:1 to about 7.0:1 for 55 weight per cent salt solution, withdrawing an aqueous salt solution (1) containing oil soluble alcohols in a higher ratio to carbonyl compounds than that originally present in said hydrocarbon solution, introducing salt solution (1) into a second extraction zone, introducing an aqueous $C_2$ to $C_6$ salt solution (2) into said second extraction zone at a point above the introduction of said salt solution (1), introducing a relatively low boiling hydrocarbon into said second extraction zone at a point below the introduction of said salt solution (1) to form a low boiling hydrocarbon rich layer and an aqueous salt solution (3) containing oil soluble alcohols in a higher ratio to carbonyls than that present in salt solution (1), subjecting said salt solution (3) to distillation whereby an overhead of alcohols, esters, carbonyls, and water is obtained, thereafter distilling said overhead up to a temperature of about 110° C., and withdrawing bottoms from said last mentioned distillation operation of oil soluble alcohols substantially free from esters, hydrocarbons and carbonyl compounds.

4. The process of claim 3 in which butane is the relatively low boiling hydrocarbon employed.

5. In a process for recovering oil soluble alcohols from a hydrocarbon solution thereof containing carbonyl compounds, at least some of which have a boiling range close to or coinciding with said alcohols and wherein said solution is subjected to extraction in an extraction zone with a 25 to 55 weight per cent aqueous carboxylic acid salt solution, said salt being derived from fatty acids selected from the group consisting of acids having an average molecular weight of 85 to 115 and acids having an average molecular weight of from about 125 to about 135, the steps which comprise introducing into said zone said hydrocarbon solution, introducing at a point above the introduction of said hydrocarbon solution one of said aqueous carboxylic acid salt solutions in an amount sufficient to produce in said extraction zone volume ratios of oil to salt solution ranging from about 0.4:1 to about 0.9:1 for 25 weight per cent salt solutions to from about 1.5:1 to about 7.0:1 for 55 weight per cent salt solutions, withdrawing an aqueous salt solution (1) containing oil soluble alcohols in a higher ratio to carbonyl compounds than that originally present in said hydrocarbon solution, introducing salt solution (1) into second extraction zone, introducing a lean aqueous solution of said salt (2) into said second extraction zone at a point above the introduction of said salt solution (1), introducing a relatively low boiling hydrocarbon into said second extraction zone at a point below the introduction of said salt solution (1) to form a low boiling hydrocarbon rich layer and an aqueous salt solution (3) containing oil soluble alcohols in a higher ratio to carbonyls than that present in salt solution (1).

References Cited in the file of this patent

UNITED STATES PATENTS

| | | |
|---|---|---|
| 2,274,750 | Soenksen | Mar. 3, 1942 |
| 2,535,071 | Walker | Dec. 26, 1950 |
| 2,540,143 | Solomon | Feb. 6, 1951 |
| 2,568,517 | Sharp et al. | Sept. 18, 1951 |
| 2,645,655 | Pearce | July 14, 1953 |

FOREIGN PATENTS

| | | |
|---|---|---|
| 970,881 | France | June 28, 1950 |